United States Patent [19]
Hluchyj

[11] Patent Number: 6,151,325
[45] Date of Patent: Nov. 21, 2000

[54] METHOD AND APPARATUS FOR HIGH-CAPACITY CIRCUIT SWITCHING WITH AN ATM SECOND STAGE SWITCH

[75] Inventor: Michael G. Hluchyj, Wellesley, Mass.

[73] Assignee: Cisco Technology, Inc., San Jose, Calif.

[21] Appl. No.: 08/828,883

[22] Filed: Mar. 31, 1997

[51] Int. Cl.[7] ................................................. H04L 12/64
[52] U.S. Cl. ........................................... 370/398; 370/466
[58] Field of Search .................................. 370/356, 398, 370/399, 465, 466

[56] References Cited

U.S. PATENT DOCUMENTS

| | | | |
|---|---|---|---|
| 4,232,199 | 11/1980 | Boatright et al. | 179/18 B |
| 4,455,646 | 6/1984 | Bloodworth | 370/66 |
| 4,771,425 | 9/1988 | Baran et al. | 370/85 |
| 4,803,720 | 2/1989 | Newell et al. | 379/202 |
| 4,819,228 | 4/1989 | Baran et al. | 370/85 |
| 4,903,261 | 2/1990 | Baran et al. | 370/94.2 |
| 4,975,906 | 12/1990 | Takiyasu et al. | 370/85.13 |
| 4,985,889 | 1/1991 | Frankish et al. | 370/94.1 |
| 5,020,058 | 5/1991 | Holden et al. | 370/109 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,115,431 | 5/1992 | Williams et al. | 370/94.1 |
| 5,119,403 | 6/1992 | Krishnan | 375/39 |
| 5,128,945 | 7/1992 | Enns et al. | 371/37.1 |
| 5,224,099 | 6/1993 | Corbalis et al. | 370/94.2 |
| 5,255,291 | 10/1993 | Holden et al. | 375/111 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,313,454 | 5/1994 | Bustini et al. | 370/13 |
| 5,317,562 | 5/1994 | Nardin et al. | 370/16 |
| 5,359,592 | 10/1994 | Carbalis et al. | 370/17 |
| 5,394,394 | 2/1995 | Crowther et al. | 370/60 |
| 5,408,527 | 4/1995 | Tsutsu | 379/211 |

(List continued on next page.)

FOREIGN PATENT DOCUMENTS

| | | |
|---|---|---|
| 677941 A2 | 10/1995 | European Pat. Off. . |
| WO 95/20282 | 7/1995 | WIPO . |
| WO 96/04729 | 2/1996 | WIPO . |

OTHER PUBLICATIONS

"Utopia Specification Level 1, Version 2.01," (af–phy–0017.000), *The ATM Forum Committee*, Mar. 21, 1994, 19 pages.

Anthony Alles, "ATM Internetworking," *Cisco Systems, Inc.*, May 1995, 59 pages.

"Utopia Level 2, Version 1.0," (af–phy–0039.000), *The ATM Forum Committee*, Jun. 1995, 69 pages.

*Primary Examiner*—Melvin Marcelo
*Attorney, Agent, or Firm*—Baker Botts L.L.P.

[57] ABSTRACT

A high-capacity multistage switching system includes a second stage ATM switch that interconnects multiple lower-capacity switch modules. The switching system dynamically establishes a connection between the switch ports of two switch modules, using as part of the connection a permanent virtual connection, i.e., a pre-established connection path, through the ATM switch. Each switch module includes one or more switch ports, an ATM interface card and a time-division-multiplexed "TDM" bus that transfers user data between the switch ports and the ATM interface card. A system controller dynamically establishes connections between two given switch ports establishing one or more virtual trunks to transfer the user data between the TDM buses of the switch modules and cell payloads of ATM cells that are directed over the appropriate pre-established connection path through the ATM switch. The system controller then assigns to the connections transmit and receive timeslots on the TDM bus and octets in virtual trunk structures that are associated with the virtual trunks. The ATM card retrieves user data from the transmit timeslots and places the data in the octets of the virtural trunk structures, and then assembles the structures in ATM cells that are directed along the selected connection path. An ATM card that receives an ATM cell disassembles the cell into the constituent virtual trunk structures and retrieves user data from the octets of the structures and places the data on the TDM bus in the receive timeslots.

27 Claims, 8 Drawing Sheets

U.S. PATENT DOCUMENTS

| | | | |
|---|---|---|---|
| 5,412,660 | 5/1995 | Chen et al. | 370/110.1 |
| 5,422,880 | 6/1995 | Heitkamp et al. | 370/60 |
| 5,426,634 | 6/1995 | Cote et al. | 370/58.2 |
| 5,430,715 | 7/1995 | Corbalis et al. | 370/54 |
| 5,434,863 | 7/1995 | Onishi et al. | 370/85.13 |
| 5,444,703 | 8/1995 | Gagliardi et al. | 370/60.1 |
| 5,452,306 | 9/1995 | Turudic et al. | 370/110.1 |
| 5,461,624 | 10/1995 | Mazzola | 370/85.13 |
| 5,473,599 | 12/1995 | Li et al. | 370/16 |
| 5,473,607 | 12/1995 | Hausman et al. | 370/85.13 |
| 5,509,006 | 4/1996 | Wilford et al. | 370/60 |
| 5,517,488 | 5/1996 | Miyazaki et al. | 370/16 |
| 5,519,704 | 5/1996 | Farinacci et al. | 370/85.13 |
| 5,553,135 | 9/1996 | Xing | 379/399 |
| 5,555,244 | 9/1996 | Gupta et al.. | 370/60.1 |
| 5,561,663 | 10/1996 | Klausmeier | 370/17 |
| 5,561,669 | 10/1996 | Lenney et al. | 370/60.1 |
| 5,570,360 | 10/1996 | Klausmeier et al. | 370/60 |
| 5,583,862 | 12/1996 | Callon | 370/397 |
| 5,594,727 | 1/1997 | Kolbenson et al. | 370/442 |
| 5,594,732 | 1/1997 | Bell et al. | 370/401 |
| 5,598,581 | 1/1997 | Daines et al. | 395/872 |
| 5,604,741 | 2/1997 | Samueli et al. | 370/402 |
| 5,612,957 | 3/1997 | Gregerson et al. | 370/401 |
| 5,617,417 | 4/1997 | Sathe et al. | 370/394 |
| 5,617,421 | 4/1997 | Chin et al. | 370/402 |
| 5,659,542 | 8/1997 | Bell et al. | 370/496 |
| 5,666,353 | 9/1997 | Klausmeier et al. | 370/230 |
| 5,673,265 | 9/1997 | Gupta et al. | 370/432 |
| 5,691,997 | 11/1997 | Lackey, Jr. | 371/53 |
| 5,729,546 | 3/1998 | Gupta et al. | 370/434 |
| 5,732,079 | 3/1998 | Castrigno | 370/362 |
| 5,737,526 | 4/1998 | Periasamy et al. | 395/200.06 |
| 5,737,635 | 4/1998 | Daines et al. | 395/872 |
| 5,740,171 | 4/1998 | Mazzola et al. | 370/392 |
| 5,740,176 | 4/1998 | Gupta et al. | 370/440 |
| 5,742,604 | 4/1998 | Edsall et al. | 370/401 |
| 5,742,649 | 4/1998 | Muntz et al. | 375/371 |
| 5,764,636 | 6/1998 | Edsall | 370/401 |
| 5,764,641 | 6/1998 | Lin | 370/412 |
| 5,765,032 | 6/1998 | Valizadeh | 395/200.65 |
| 5,787,070 | 7/1998 | Gupta et al. | 370/217 |
| 5,787,255 | 7/1998 | Parlan et al. | 395/200.63 |
| 5,793,763 | 8/1998 | Mayes et al. | 370/389 |
| 5,793,978 | 8/1998 | Fowler | 395/200.56 |
| 5,796,732 | 8/1998 | Mazzola et al. | 370/362 |
| 5,802,042 | 9/1998 | Natarajan et al. | 370/255 |
| 5,805,595 | 9/1998 | Sharper et al. | 370/442 |
| 5,809,422 | 9/1998 | Raleigh et al. | 455/449 |
| 5,812,618 | 9/1998 | Muntz et al. | 375/372 |
| 5,822,383 | 10/1998 | Muntz et al. | 375/362 |
| 5,835,036 | 11/1998 | Takefman | 341/95 |
| 5,835,481 | 11/1998 | Akyol et al. | 370/216 |
| 5,835,494 | 11/1998 | Hughes et al. | 370/397 |
| 5,835,725 | 11/1998 | Chiang et al. | 395/200.58 |
| 5,838,683 | 11/1998 | Corley et al. | 370/408 |
| 5,838,915 | 11/1998 | Klausmeier et al. | 395/200.45 |
| 5,838,994 | 11/1998 | Valizadeh | 395/876 |
| 5,859,550 | 1/1999 | Brandt | 327/156 |
| 5,864,542 | 1/1999 | Gupta et al. | 370/257 |
| 5,867,666 | 2/1999 | Harvey | 395/200.68 |

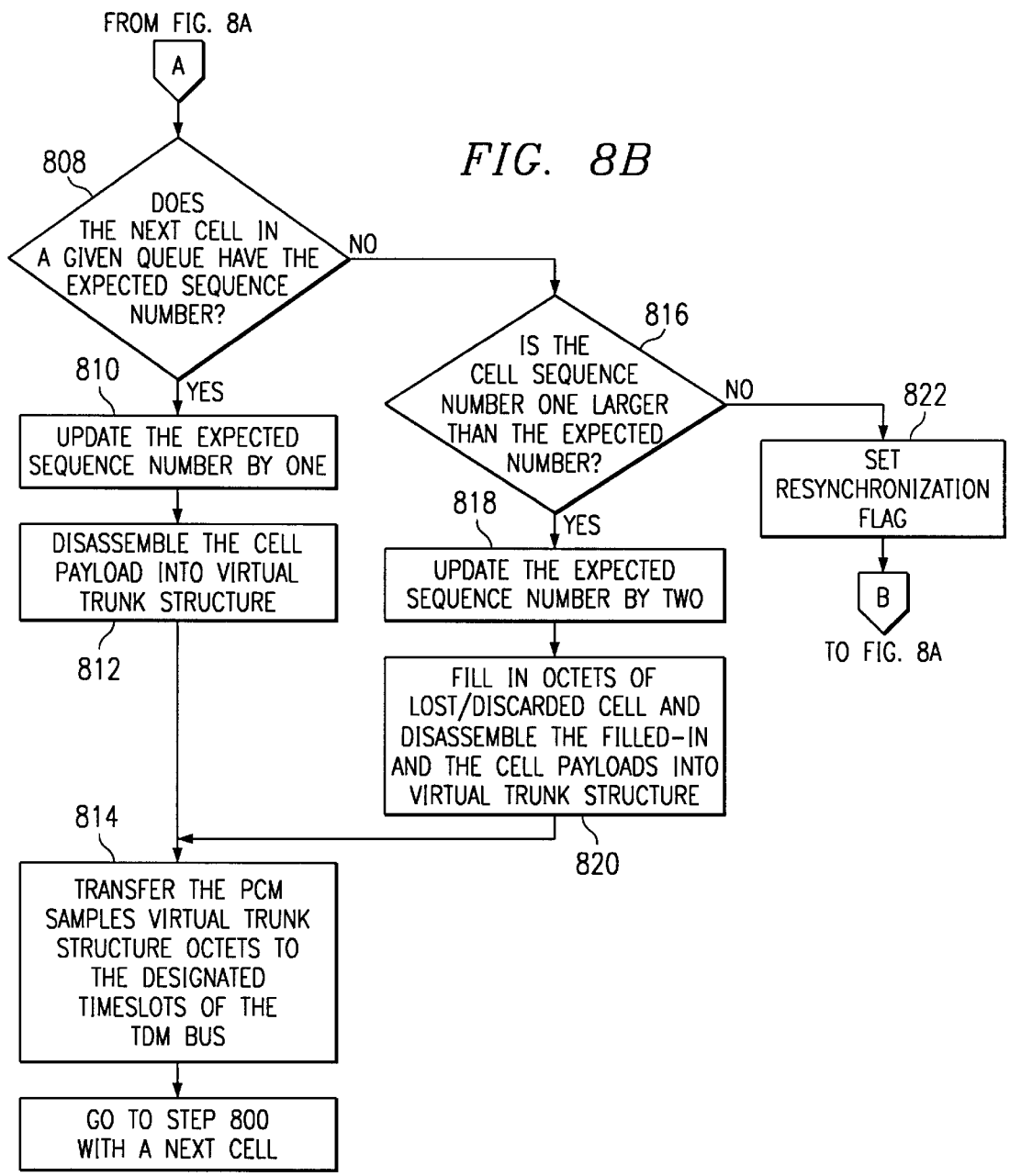

METHOD AND APPARATUS FOR HIGH-CAPACITY CIRCUIT SWITCHING WITH AN ATM SECOND STAGE SWITCH

FIELD OF THE INVENTION

This invention relates to multistage switches for use in digital telecommunications networks.

BACKGROUND OF THE INVENTION

There are two types of telecommunications networks that are of interest to the discussion of the invention, namely, circuit switched networks and asynchronous transfer mode ("ATM") networks.

1. Circuit Switched Networks

A circuit switched network may be used to provide voice communication paths between telephone subscribers. In the circuit switched network, a subscriber originating a call to another subscriber signals an end office, that is, an office of the telephone service provider, by taking a telephone handset off of its hook. After receiving a dial tone from the end office, the caller dials the digits of the telephone number of the subscriber with whom he wishes to speak. The end office then uses the dialed information to determine an efficient voice transmission path to the called subscriber through the circuit switched network.

The circuit switched network consists of transmission facilities, such as, for example, serial transmission lines or fiber optic cables, and switches that interconnect the transmission facilities. There are generally two types of switches in a circuit switched telecommunications network, namely, an end office switch and a toll/tandem, or trunk-side, switch. The end office switch attaches to subscriber equipment (telephone sets) on one side and interoffice trunks on the other side. The toll/tandem switch attaches to the interoffice trunks only. Interoffice trunks provide communication paths between two end offices, between end offices and toll/tandem switches, and between two toll/tandem switches.

Typically, digital transmission and digital switching technologies are used by the circuit switched network to achieve high-quality transmission of the voice signals. Before the voice signals are transmitted over the network from the end office switch, they are encoded in accordance with a pulse code modulation (PCM) scheme. With PCM, the voice signals are sampled 8,000 times per second (or once every 125 microseconds), and each sample is quantized to an 8-bit value. The transmission rate is thus 64 kb/s for a single channel.

The end office generally time division multiplexes the channels, to allow a number of calls to be serviced simultaneously over a single high-speed digital transmission facility. With time division multiplexing ("TDM"), PCM samples from each of the multiplexed channels are included in a TDM transmission frame that is then transmitted by the end office switch over the transmission facility. If the transmission facility is a T1 carrier, for example, the TDM transmission frames include 24 8-bit samples that represent 24 separate channels. Each channel is assigned a frame timeslot position in the transmission frame, and 20 one sample from each channel is included in each frame. The frames are transmitted once every 125 microseconds, or once per PCM sample period, with successive samples from the individual channels included in the corresponding timeslot positions in the succeeding frames.

The timeslot assignments on the switch's inbound and outbound transmission facilities are decoupled. Thus, for example, a call may be assigned timeslot position 17 in the transmission frames transmitted to the switch on an inbound TDM transmission facility, and assigned timeslot position 5 on the frames transmitted from the switch on an outbound TDM transmission facility. The channels are, of course, full duplex, and the timeslot assignments for the transmission frames that return to the call originator through the switch are generally the same as the timeslot assignments in the transmission frames that are transmitted through the switch from the call originator. That is, for a given transmission facility between two switches, the same timeslot position is used for both transmission directions of the call.

A switch in a circuit switched network that receives a transmission frame over an inbound TDM transmission facility must thus remove the PCM samples from the frame timeslots and transfer the samples to designated timeslots in one or more frames that are to be transmitted over one or more outbound TDM transmission facilities. The timeslot assignments are determined by the switch controller, as part of the connection establishment operations using inter-switch signaling mechanisms.

The switch architecture of interest includes a high-speed parallel bus that receives PCM samples from and transfers the samples to the inbound and outbound TDM transmission facilities that are attached to the switch. The switch also includes interface circuits, or cards, that transfer the PCM samples between the high-speed parallel bus and the TDM transmission facilities. Each interface card must have access to every line of the fines of the parallel bus during every PCM sample period. The interface card thus includes a high-speed driver for each line of the parallel bus. Examples of this type of architecture include the MultiVendor Integration Protocol (MVIP) and Signal Computing System Architecture (SCSA) bus standards.

The capacity of the switch is determined by the speed of the parallel bus and the number of lines on the bus. In order to avoid blocking at the switch, the parallel bus must have a bandwidth that is equal to the sum of the capacities of the inbound transmission facilities. To increase the capacity of the switch, the speed of the parallel bus must be increased and/or the number of lines in the bus must be increased.

The speed of the bus is limited by existing technology. The number of lines is limited essentially by the cost of the interface circuitry required to provide access to the bus. To minimize costs, two or more inbound TDM transmission facilities may be associated with a single interface card, and thus, share the interface circuitry. However, the cost of the interface cards necessarily increases as the speed of the parallel bus and/or the number of lines in the bus is increased. Accordingly, it is relatively expensive to increase the capacity of the switch, even with the shared use of the interface cards.

One way to increase the capacity of the switch without increasing the complexity of the interface cards is to use a multistage switch. The multistage switch combines the capacities of multiple lower-capacity switches, and thus, multiple high-speed parallel buses, to operate as a single high-capacity switching system. One example of a multistage switch uses a second switching stage in what is commonly referred to as a time-space-time switch architecture. The time-space-time switch architecture includes a center space-division switch matrix, commonly referred to as a time-multiplexed switch, which transfers the PCM samples from the timeslots on one set of multiple high-speed parallel buses to the timeslots on a second set of multiple high-speed parallel buses.

The space-division matrix, which is similar in operation to a cross-bar switch, is reconfigured once per TDM timeslot. The interface circuitry that connects the buses to the switch matrix ensures that the PCM samples are appropriately time multiplexed, that is, that the samples from the inbound transmission frames are placed in the appropriate timeslots of the outgoing transmission frames. The incoming and outgoing frames for the two transmission facilities are decoupled, in the sense that the PCM samples associated with a call may be assigned to different timeslot positions in the two frames.

A limitation of the space-division switch matrix is that the switch matrix must be custom designed for each multistage switch. If the capacity of the multistage switch is to be increased by adding more lower-capacity switches, a new switch matrix is required. Further, the lower-capacity switches must be physically present at the switch matrix, and thus, these switches cannot be distributed over the network.

A fiber ring may be used as the second stage of the multistage switch. However, this configuration has the same scaling problems as the single stage circuit switch. Specifically, in order to increase the overall capacity of this multistage switch beyond the capacity of a single ring, the system designer must add to the system one or more additional fiber rings and the relatively expensive interface circuitry that is required to connect the parallel buses to these rings.

2. ATM Networks

ATM technology is becoming more widely used in telecommunication networks that transfer data and video signals as well as voice signals. An ATM network consists of ATM switches, high-speed ATM links that interconnect the switches, and user-network access links that interconnect the users with the network.

In an ATM network, information is transported over the ATM link in fixed-length, 53-octet cells. Communications over the ATM network take place by the relaying of the fixed-length ATM cells over connection paths determined by a network routing procedure. The cells are thus routed over designated ATM links and through designated switches between a source edge and a destination edge of the connection path. Cells from several different connections may be multiplexed and transported over the same ATM link to a switch, in which case the switch demultiplexes the cells before it relays them to the appropriate outgoing links.

Each 53-octet ATM cell consists essentially of a 5-octet header that contains information necessary to relay the cell and a 48-octet cell payload that contains the user data. The cell header includes a Virtual Path Identifier (VPI) and Virtual Channel Identifier (VCI) value that identifies the connection. When a switch receives a cell, the switch uses the VPI/VCI value in the cell header to associate the cell with the appropriate path, and then sends the cell over the next ATM link on the path. The VPI/VCI value is actually associated with the link over which the cell traveled to the switch. The switch thus updates the VPI/VCI value before relaying the cell to the next switch over the designated link. The VPI/VCI values associated with each link on the connection path are determined by network signaling procedures when the connection is established.

The use of both a path identifier, VPI, and a channel identifier, VCI, as distinct components of the VPI/VCI value provides a two-level hierarchy of multiplexing and switching. Paths are multiplexed over an ATM link using the VPIs, and channels are multiplexed within the paths using the VCIs. A group of channels that are directed along the same ATM links between two points in a network can be routed by virtual path switching, to simplify the cell relay operations at intermediate switches.

The mapping of user data into ATM cells is referred to as "adaptation," and ATM standards have defined five different adaptation layers. ATM Adaptation Layer 1 (AAL1), which is defined in ITU-T Recommendation I.363, allows one to map user data from a constant bit rate source into cells at the source edge of a connection path and reproduce the constant bit rate stream at the destination edge of the connection path. AAL1 provides for the segmentation of the user data into the ATM cells and reassembly of the user data from the cells, the handling of cell delay variation and lost and misinserted cells, the recovery at the receiver of the source clock frequency and the source data structure (i.e., byte and other framing boundaries of the data), and so forth. A Circuit Emulation Service Interoperability Specification (ATM Forum, af-saa-0032.000, September 1995) specifies the ATM Forum's interoperability agreements for supporting constant bit rate traffic over ATM networks. Using the circuit emulation services, standard constant bit rate circuits, such as 64 kb/s PCM channels over a T1 carrier system, can be connected across an ATM network using AAL1.

There are two types of ATM network connections between subscribers, namely, a permanent virtual connection (PVC) and a switched virtual connection (SVC). The PVC and the SVC are distinguished by the manner in which they are established. The PVC is independently established by the network administrator, i.e., established without reference to a particular call, and is the simplest to implement. The SVC is established on demand by the exchange of signaling messages between a caller and the network, and involves the use of both user-access signaling protocols and intra-network signaling protocols.

In a network that uses PVCs, that is, a network that uses pre-established communications paths between users, user data is sent over the network by selecting the appropriate pre-established path based on the destination of the data, and relaying the data in cells through the various switches on the path. The switches relay the cells using the connection path information that was provided by the network administrator when the path was independently established. There is thus no need for a connection establishment protocol between the user and the network, and/or between the network switches. This makes the ATM networks that use PVC's easy to implement. However, such networks cannot dynamically respond to changes in the traffic demands of the users.

With SVCs, the network dynamically establishes and terminates connections in a manner that is analogous to the traditional voice telephone networks discussed above. A network that includes SVCs must support a user connection signaling interface protocol, to exchange connection establishment information such as that defined in the ATM ITU-T User Network Signaling Interface Specification Q.2931. Further, the network must support the intra-network communications that are necessary to establish the connections through the network switches. Thus, a network that uses SVCs is more complicated to implement than one that uses PVCs. Indeed, today most ATM networks use only PVCs.

A PVC may be used to connect constant bit rate circuits through the ATM network. While simple, this provides the equivalent of a leased-line circuit, which cannot be dynamically established to respond to traffic demand changes in the network. Alternatively, an SVC may be used to connect the constant bit rate circuits through the ATM network. Such a connection can be dynamically routed when it is established, and thus, responds to changes in the traffic demand. This is achieved, however, at the expense of an increase in the complexity and the cost of the ATM network.

SUMMARY OF THE INVENTION

A high-capacity multistage switching system includes a second stage ATM switch that interconnects multiple lower-capacity switch modules. The switching system dynamically establishes a connection between the switch ports of two switch modules, using as part of the connection a permanent virtual connection, i.e., a pre-established connection path, through the ATM switch. The switching system thus dynamically establishes a connection through the switching system without requiring the use of connection establishment protocols between the switch modules and the ATM switch. The switching system uses standards-based ATM cell transmission and circuit emulation service techniques to connect constant bit rate circuits through the ATM switch.

Each switch module includes over its backplane a high-speed parallel TDM bus. A system controller dynamically establishes a connection between the ports of two switch modules by assigning to the connection at each switch module (i) transmit and receive tireslots on the TDM bus, and (ii) octets in "virtual trunks," which are virtual connections through the switching system that pass from one switch module to another sequences of multiple-octet structures. The multiple-octet structures transfer user data in the form of PCM samples from the timeslots of the TDM bus to the cell payloads of ATM cells. A given virtual trunk, which is associated with a particular pre-established connection path through the ATM switch, is associated with a particular VPI value for a given ATM link of the path. Multiple virtual trunks associated with the same VPI value are distinguished by VCI values.

Using the assigned timeslots, the transmitting switch module transfers user data in is the form of PCM samples to the TDM bus. Then, using the octet assignments, the switch module transfers the PCM samples from the designated timeslots to the octets of the virtual trunk structure. The switch module next assembles the virtual trunk structures into the cell payloads of ATM cells, and transmits the cells to the ATM switch. The ATM switch relays the cells to the receiving switch module over the pre-established connection path identified by the VPI. Using the octet and timeslot assignment information provided by the system controller, the receiving switch module retrieves the virtual trunk structures from the cell payloads of the ATM cells, and transfers the PCM samples from the virtual trunk structures to the timeslots of the TDM bus.

More specifically, the system controller sends TDM timeslot and virtual trunk octet assignments and associated VPI/VCI information to the switch modules over a network connection, such as an Ethernet. A given port on a switch module uses the assigned TDM timeslots to transfer user data in the form of PCM samples over the switch module TDM bus to a resident ATM interface card. The ATM interface card uses the TDM timeslot and virtual trunk octet assignments and the associated VPI/VCI information to transfer the PCM samples from the TDM bus to the cell payload octets of ATM cells that are directed to the appropriate switch modules, i.e., to the cell payloads of ATM cells that are associated with the appropriate VPI/VCI values. After assembling each cell, the ATM interface card sends the cell to the ATM switch over a high-speed ATM link, such as on OC3c link.

The ATM switch uses the VPI information in the individual cells to relay the cells along the pre-established connection paths to the appropriate switch modules. At the receiving module, the ATM interface card uses the virtual trunk octet assignments and VPI/VCI information provided by the system controller to recover the PCM samples from the cells and associate the samples with the particular connections. The ATM interface card then uses the TDM timeslots assignments provided by the system controller to transfer the PCM samples over the switch module's TDM bus to the appropriate switch ports.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
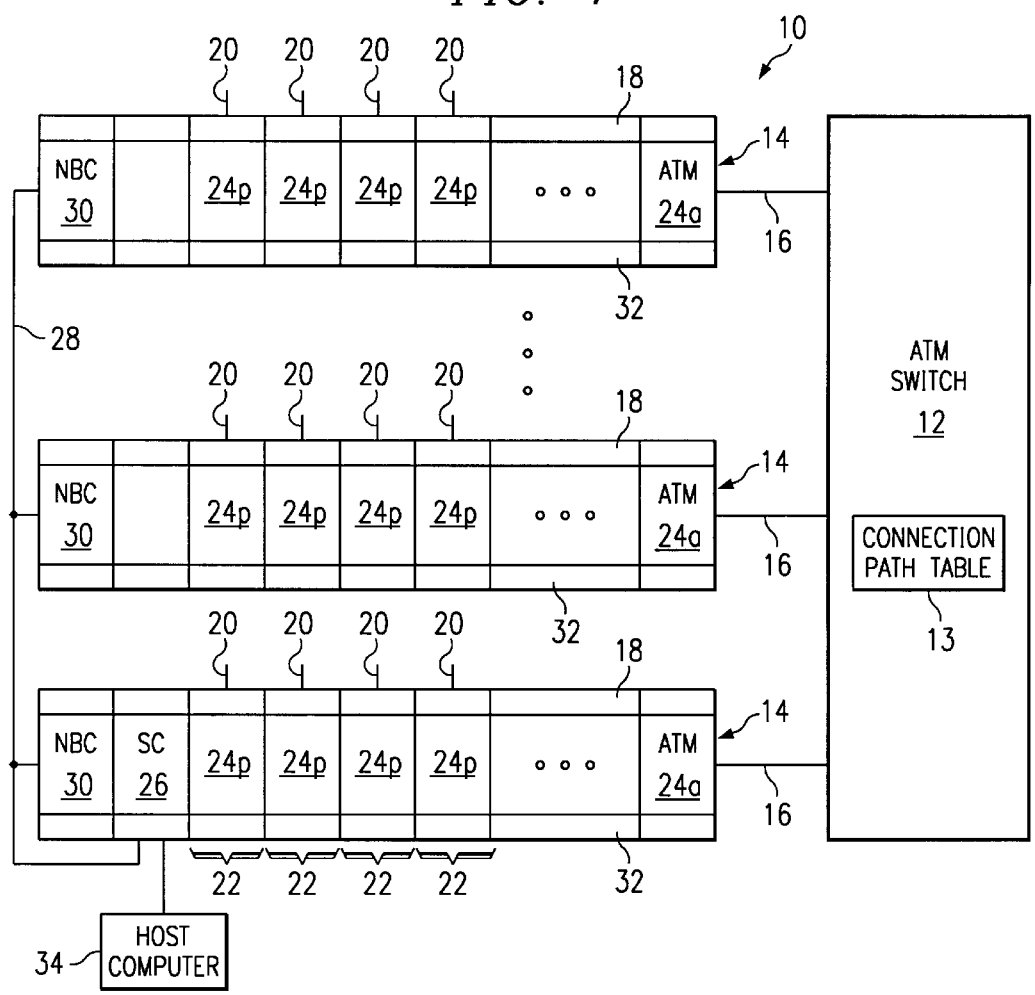
FIG. 1 is a functional block diagram of a switching system constructed in accordance with the invention.

Referring to FIG. 1, a high-capacity, multistage switching system 10 includes a second stage ATM switch 12 that interconnects a plurality of lower-capacity switch modules 14 over high-speed ATM links 16, such as OC3c lines. The ATM switch 12 includes a connection path table 13 that contains information relating to the pre-established connection paths (PVCs) through the ATM switch 12.

Each switch module 14 includes universal card slots 22 that house interface cards 24 that may be used configure the switch module with a variety of standard analog (e.g., SLIC, E&M, DID) and digital (e.g., T1, E1) interfaces, and/or standard signaling interface (e.g., SS7, ISDN D-channel). In addition, the card slots may be used in a known manner to provide telephony service resources such as digital tone generation, Dual-Tone Multi-Frequency (DTMF) and Multi-Frequency (MF) receivers, and functions such as call progress analysis, conferencing, and prompting/recording. The interface cards 24p that transfer user data to and from attached transmission facilities 20 are also referred to hereinafter as switch port cards.

Each switch module 14 includes at least one ATM interface card 24a and a high-speed parallel TDM bus 18, for transferring user data in the form of PCM samples between the switch port cards 24p and the ATM interface card 24a. The ATM interface card 24a transfers the PCM samples from the TDM bus 18 to the cell payloads of ATM cells, and then transmits the cells to the ATM switch 12. The ATM interface card 24a also recovers PCM samples from ATM cells received from the ATM switch 12 and transfers the samples to the receive timeslots on the TDM bus. The operations of the ATM interface card 24a are described in more detail below with reference to FIG. 2.

A system controller 26, which is resident on one of the switch modules 14 in the switching system 10, controls use of the TDM buses 18 and the high-speed ATM links 16, to dynamically establish connections between the switch ports 24p on the various switch modules 14. The system controller 26 establishes a connection by assigning to it at each of the switch modules (i) transmit and receive timeslots on the TDM buses 18, and (ii) octets in "virtual trunks" that are associated with appropriate VPI/VCI values. The system controller 26 sends the timeslot and octet assignments to the switch modules 14 over a network bus 28, such as an Ethernet connection. In each switch module 14, a network bus controller 30 connected to the network bus 28 receives the connection information and provides connection instructions to the switch port interface cards 24p and the ATM interface card 24a over a packet communication bus 32. The system controller 26 may instead send the connection control information to the switch modules 14 through the ATM switch 12, using the ITU-T standards-defined AAL5 to segment the control messages into ATM cells.

As discussed in more detail with reference to FIG. 3 below, a virtual trunk is a virtual connection that transfers through the switching system a sequence of multiple-octet structures that contain PCM samples from the TDM bus. The multiple-octet structures, referred to hereinafter as virtual trunk structures, are assembled in the cell payloads of ATM cells that are then directed over the connection path associated with the virtual trunk. Each new virtual trunk, which is associated by the system controller with one of the pre-established connection paths through the ATM switch, is given a unique VPI/VCI value for a given ATM link 16. Thus, each virtual trunk is associated with two VPI/VCI values—one for the link 16 between the switch module 14 associated with the call originator and the ATM switch 12 and one for the link 16 between the ATM switch 12 and the switch module 14 associated with the called subscriber. At the switch module 14, successive PCM samples associated with the same virtual trunk structures are assembled by the ATM interface card 24a into the cell payload of an ATM cell that includes the VPI/VCI value that is associated with the virtual trunk and the ATM link, and is thus directed through the switch over the selected pre-established connection path.

The ATM cells are sent by the ATM interface card 24a to the ATM switch 12 over the ATM links 16. The ATM switch 12, using the VPI values in the headers of the cells, relays the cells along the pre-established connection paths specified in the table 13, and the cells are thus transferred to the appropriate receiving switch modules 14.

The system controller 26 is not required to exchange connection establishment information with the ATM switch 12 in order to establish a connection between the ports of two switch modules 14. The ATM switch 12 thus operates as if it is in a network in which the connections are permanent virtual connections (PVCs), even though the connections are actually dynamically established by the system controller 26.

The system controller 26 communicates also with a host computer 34 that directs calls through the switching system 10 as if the system is a single high-capacity switch with the combined capacity of the plurality of switch modules 14. The host computer 34 instructs the system controller 26 to transfer user data between particular transmission facilities 20 attached to the system 10. The system controller 26 then dynamically establishes the connection between the appropriate ports 24p of the switch modules 14. The operations of the system controller 26 are discussed in more detail below with reference to FIG. 4.

As discussed above, a connection established between the ports of two switch modules 14 is an ATM constant bit rate connection that runs the ATM Forum specified circuit emulation service. If the TDM buses 18 used to connect the ports 24p to the ATM interface cards 24a are 4096-timeslot parallel buses, 2048 timeslots of each bus 18 may be allocated to the switch ports 24p, to transfer user data in the form of PCM samples to the ATM interface card 24a, and 2048 timeslots may be allocated to the ATM interface card 24a to transfer user data received from the ATM switch to the switch ports 24p. If the links 16 are OC3c lines, they can each support 2069 64 kb/s channels. This results in a non-blocking switching system. Other allocations of the TDM timeslots and ATM link resources may be made for both non-blocking and blocking configurations of the switching system 10. The channels may be bundled, as discussed below, so that multiple channels can be serviced simultaneously over a given link.

To translate the PCM samples from the TDM transmission frames to the octets of ATM cell payloads, the switching system 10 uses virtual trunk structures 320 (FIG. 3), which are structures that consist of a specified number of octets 322 (FIG. 3) used to form the cell payloads of ATM cells. The system controller 26 determines the sizes of the virtual trunk structures in numbers of octets, and assigns to a connection one or more octets of a virtual trunk structure that is directed to the appropriate switch module. The virtual trunk structures thus bundle the PCM samples from a plurality of calls that are directed between the same two switch modules.

The PCM samples are placed in the virtual trunk structures once per PCM sample period, or once every 125 microseconds. The populated structures are then assembled in the cell payloads of the ATM cells. If a virtual trunk structure contains 8 octets, 6 successive structures are required to fill a 48-octet cell payload. Since a structure is filled once per PCM sample period, it takes 750 microseconds to assemble the cell payload.

Each time a connection is established, the system controller 26 assigns to the connection one or more otherwise unused octets 322 in an existing virtual trunk that is directed between the transmitting switch module 14 and the receiving switch module 14. If, however, all of the octets in the virtual trunk structure are already assigned, the system controller 26 establishes another virtual trunk, and assigns one or more octets of the newly-established virtual trunk to the connection. The system controller distinguishes between the two virtual trunks by associating them with different VCIs. The two virtual trunks are, however, associated with the same VPI, since they are directed along the same pre-established path through the ATM switch to the receiving switch module. In this way, the system may use multiple virtual trunks, and thus, multiple sets of bundled 64 kb/s channels, to transfer information between the two switch modules.

Figure 2:
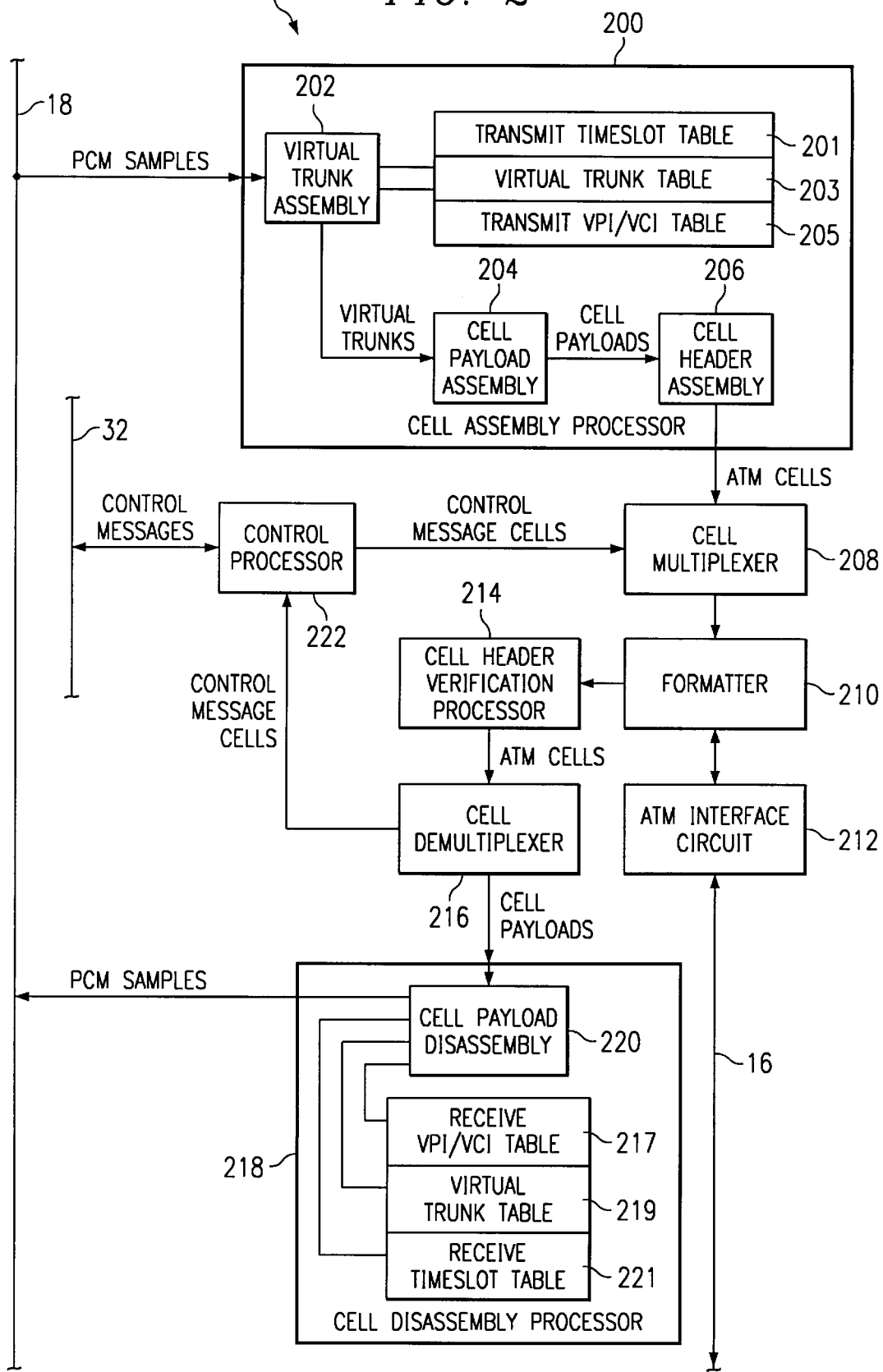
FIG. 2 is a functional block diagram of an ATM interface card that is included in the switching system of FIG. 1.
Figure 3:
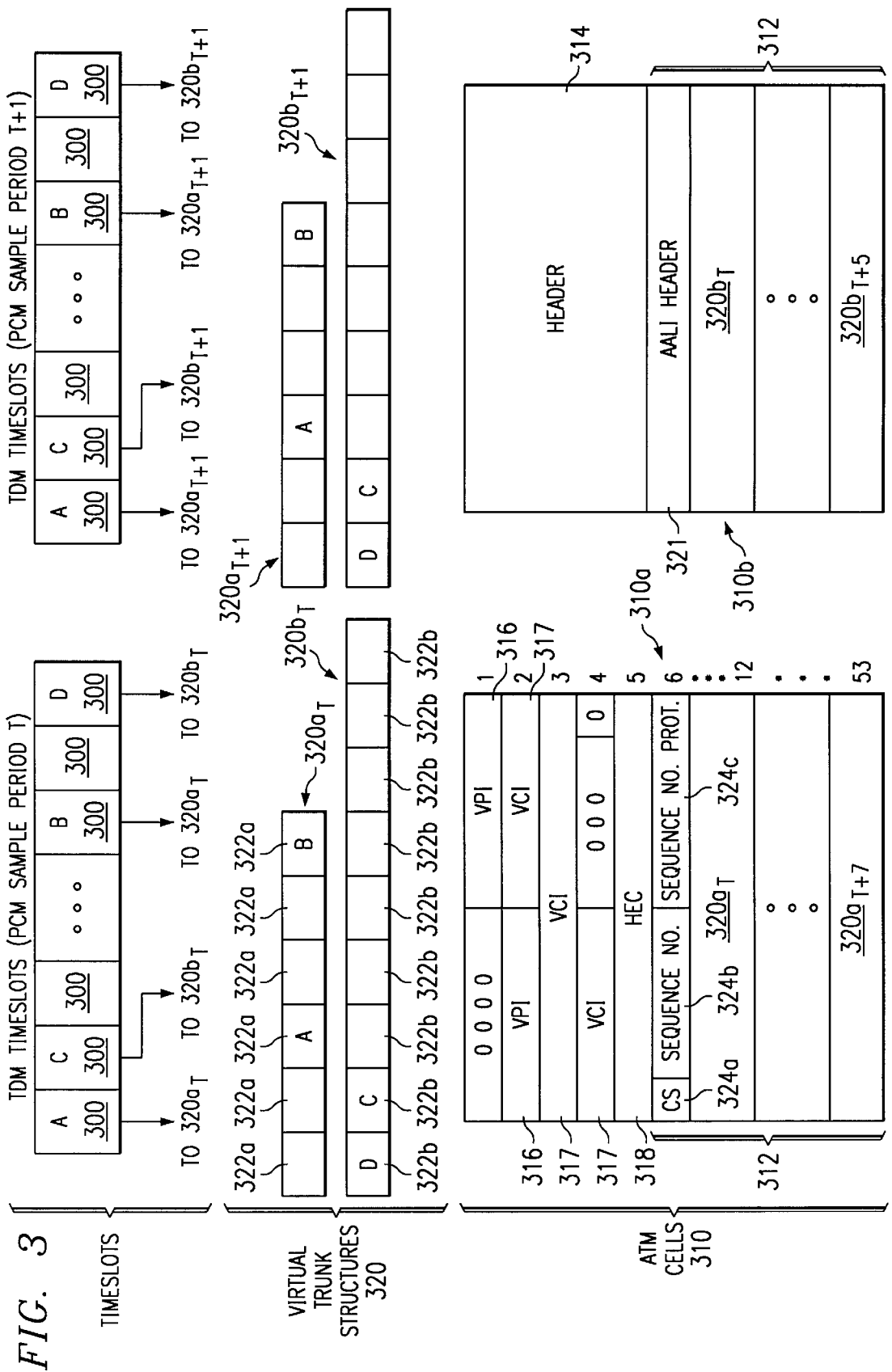
FIG. 3 illustrates the transfer of data from a TDM bus to an ATM cell.

Referring now to FIGS. 2 and 3, the operations of the ATM interface card 24a are discussed. The ATM interface card 24a stores the connection information provided by the system controller 26 in tables. It stores transmit timeslot assignments in table 201; receive timeslots assignments in table 221; virtual trunk octet assignments in tables 203 and 219; and maps of virtual trunks to VPI/VCI values in tables 205 and 217. One or more of these tables may be combined, as appropriate.

A cell assembly processor 200, using the information in the transmit timeslot table 201 removes PCM samples from the appropriate timeslots 300 of the TDM switch module bus 18. A virtual trunk assembly subsystem 202 places the PCM samples in appropriate octets 322 of the virtual trunk structure 320, following the TDM timeslot to octet mapping in table 203.

In the example depicted in FIG. 3, the virtual trunk assembly subsystem 202 transfers in samples A and B, which are directed to the same switch module 14, to two octets 322a in a 6-octet virtual trunk structure 320a, and samples C and D, which are both directed to another switch module, to two octets 322b in a 9-octet virtual trunk structure 320b.

The cell assembly processor 200 operates in accordance with AAL1. A cell payload assembly subsystem 204 assembles successive virtual trunk structures 320a and 320b, respectively, into the cell payloads 312 of ATM cells 310a and 310b that are associated with the appropriate VPI/VCI values. The subsystem 204 also includes as the first octet of each of the cell payloads an appropriate AAL1 header 324.

The AAL1 header 324 includes a CS bit 324a, a 3-bit sequence number 324b, and a 4-bit sequence number protection symbol 324c. The CS bit 324a indicates whether or not a virtual trunk structure framing pointer is included in a cell. If the CS bit is a one, a pointer that points to the start of the next virtual trunk structure is included as the second octet of the cell payload. If the CS bit is a zero, the second octet of the cell payload is instead part of a virtual trunk structure. The sequence number 324b, which ranges from zero to seven and is incremented module eight, is assigned in order to the ATM cells with the same VPI/VCI values. This enables a receiving switch module to determine, in a conventional manner, if one or more ATM cells in a stream of cells transmitted between two switch modules has been lost. The sequence number protection symbol 324c is used by the receiving switch module in a conventional manner to determine if the sequence number in the cell is error-free and/or to correct any errors in the sequence number, as appropriate.

The cell payload assembly subsystem 204 includes in the 48 octet cell payload 312 of the ATM cell 310a: a one-octet AAL1 header 324 with a CS bit set to zero, seven complete virtual trunk structures 320a of size 6 octets and five octets of an eighth virtual trunk structure 320a. The cell payload is thus assembled with samples from eight TDM transmission frames. A next ATM cell 310a (not shown) includes: a one-octet AAL1 header with a next sequence number and a CS bit set to one, a one-octet structure framing pointer, the one remaining octet of the segmented structure that is partially included in the previous cell, seven complete virtual trunk structures 320a and three octets of an eighth virtual trunk structure 320a. The pointer included in the second octet points to the fourth octet in this cell payload, which is the start of the next virtual trunk.

The cell payload assembly subsystem 204 similarly assembles the cell payload 312 of an ATM cell 310b by including as the first octet an AAL1 header 321 with a CS bit of zero, and as the remaining octets five complete virtual trunk structures 320b of size 9 octets and two octets from a sixth virtual trunk structure 320b. The remaining seven is octets of the segmented structure are included in the next ATM cell 310b (not shown).

The ATM cells 312b are formed approximately once every five TDM transmission frames.

The cell payload assembly subsystem 204 includes structure framing pointers periodically in the cells, to allow a receiving switch module to reproduce the virtual trunks, i.e., to determine the virtual trunk structure boundaries, even if one or more of the ATM cells in a sequence are lost or corrupted. The pointers may be included, for example, once every eight cells starting from cell sequence number zero.

Once an ATM cell payload is filled, a cell header assembly subsystem 206 places VPI and VCI indicators and an associated header error control (HEC) value, respectively, in a VPI field 316, a VCI field 317 and an HEC field 318 of the cell header 314. The remaining fields of the header 314 are filled by the subsystem 206 with all zeros. The VPI, VCI and HEC values are determined by the system controller 26 when the connection is dynamically established. These values are then stored at the ATM interface card 24a in the VPI/VCI table 205.

After applying the ATM cell headers, the cell header assembly subsystem 206 sends the ATM cells 310a and 310b to a cell multiplexer 208. The cell multiplexer 208 queues the ATM cells in a circuit emulation cell queue (not shown) for transfer to the link 16. As appropriate, the cell multiplexer 208 also queues any control message cells (not shown) for delivery from a control processor 222 to the ATM switch 12. The ATM circuit emulation cell queue is given priority over the control message cell queue, such that the ATM circuit emulation cells are not delayed while the control messages are transmitted.

The multiplexed ATM cells are assembled in a conventional manner into a SONET payload envelope by a formatter processor 210. The formatter processor 210 adds the appropriate overhead to the SONET payload envelope and an ATM link interface circuit 212 transmits the envelope over the link 16 to the ATM switch 12, all in a conventional manner.

When the ATM switch 12 receives the SONET payload envelope, the ATM switch operates in a conventional manner to retrieve the ATM cells from the envelope. The ATM switch 12 then uses the VPIs in the cell headers to enter the connection path table 13 and withdraw from the table the information needed to relay the cells along the appropriate pre-established connection paths.

Before relaying the cells, the ATM switch 12 updates the VPI in each cell in accordance with the stored connection path information, to indicate to a receiving switch module 14 which switch module 14 originated the cell. The operations of the ATM switch 12 in updating the VPIs in discussed in more detail below with reference to FIGS. 6 and 7.

Before relaying the cells over the links 16, the ATM switch 12 operates in a conventional manner to assemble into the appropriate transmission format the cells directed along the same link 16. In the example, the ATM switch assembles the cells in SONET payload envelopes.

Referring still to FIG. 2, the ATM interface card 24a receives the SONET payload envelope over the link 16 through the ATM link interface 212. The formatter 210 removes the overhead from the envelope payload in a conventional manner, and sends the payload to a cell header verification processor 214. The cell header verification processor 214, operating in a conventional manner, re-establishes the cell boundaries and determines if the headers 314 in the individual cells are error-free.

The cell header verification processor 214 next verifies that the VPI/VCI values included in the headers 314 are valid, i.e., are associated with existing connections through the switch module 14, using the information in table 217. The cell header verification processor 214 discards any cells with erroneous headers and/or invalid VPI/VCI values, and forwards the remaining cells to a cell demultiplexer 216.

The cell demultiplexer 216 queues the cells by VPI/VCI values and removes the headers 314 and other overhead from them. It then forwards the cell payloads of any control message cells to the control processor 222, which controls the ATM-based operations of the various processors on the interface card. The cell demultiplexer also forwards the ATM circuit emulation cell payloads to a cell disassembly processor 218. Alternatively, the cell demultiplexer may forward to the cell disassembly processor 218 the next cell payloads in each of the queues, at appropriate times, i.e., when the processor 218 is ready to process the cell payloads.

The cell disassembly processor 218 disassembles ATM cell payloads into virtual trunk structures, and the virtual trunk structures into PCM samples. A cell payload disassembly subsystem 220 first determines, using the AAL1 header in the cell payload, if any cells have been lost. To do this, the subsystem 220 uses the sequence number protection symbol in the AAL1 header in a conventional manner to determine if the header sequence number is error-free and, as appropriate, to correct any errors. If the sequence number in the cell is the next number in sequence, the subsystem 220 uses the information in the receive timeslot table 221 and the trunk table 217 to disassemble the cell payload into its constituent virtual trunk structures, and transfer the PCM samples from the virtual trunk structure octets to the receive timeslots of the TDM bus 18. If a structure framing pointer is included in the cell, the subsystem 218 uses the pointer to maintain synchronism with the boundaries of the virtual trunk structure.

If the cell payload disassembly subsystem 220 determines that the sequence number in the AAL1 header is one higher than the expected number, subsystem 220 retains the cell, stuffs into the queue an appropriate number of octets that correspond to the payload of the lost cell and advances the virtual trunk structure framing. The subsystem also increments its expected sequence number by two, to determine the expected number for the next cell in the queue. The processor 220 then places the octets, both the stuffed octets and the octets of the received cell payload in the appropriate timeslots of the TDM bus 18.

The subsystem 220 replaces the octets of any lost cell with a sufficient number of copies of the most recent valid octets for that connection. This avoids a "popping" sound in a voice channel. The subsystem 218 may alternatively replace the octets with copies of one or more dummy octets.

If cell payload disassembly subsystem 220 instead determines that the sequence number differs from the expected number by more than one, the subsystem discards the cell and any subsequent cells in the same sequence until it receives a cell that contains a structure framing pointer. It then recovers the virtual trunk structure framing and resumes the octet to TDM timeslot mapping for this cell and the subsequent cells in the queue.

The cell disassembly subsystem 220 inserts a smoothing delay for each new virtual trunk. The smoothing delay mitigates the effects of cell delay variation on the constant bit rate traffic in a known manner. The length of the smoothing delay is programmed by the system controller when it establishes the new virtual trunk, and the delay instructions are sent from the system controller 26 to the receiving switch module over the network bus 28.

When the system controller 26 determines that a call has terminated, the system controller 26 sends to the switch modules 14 involved in the connection instructions to change the assignment of the TDM receive timeslots to a predetermined null value, and instructions to relinquish the octets in the virtual trunks associated with the appropriate VPI/VCI.

As calls are terminated and new calls established, it may become necessary to reassign one or more of the established calls to different virtual trunks, that is, to virtual trunks associated with the same VPIs but different VCIs. This may be done, for example, to avoid multiple, partially used virtual trunks, and the inefficiencies associated therewith. Such reassignments are generally only necessary when the links 16 are under heavy use.

In order to prevent loss of user data, the reassignment is made essentially in two steps. In a first step the system controller 26 assigns the call's timeslots to both the virtual trunk to which the call is currently assigned, the "old" virtual trunk, and to the virtual trunk to which the call is to be reassigned, the "new" virtual trunk. The receiving end of the connection then changes the virtual trunk assignment locally from the old virtual trunk to the new one. After the change is made, the receiving end sends a control message to the system controller 26, notifying it of the completed local reassignment. In response to the control message, the system controller frees the octets on the old virtual trunk.

Set forth below is a discussion of the operations of the switching system by way of an example.

Figure 4:
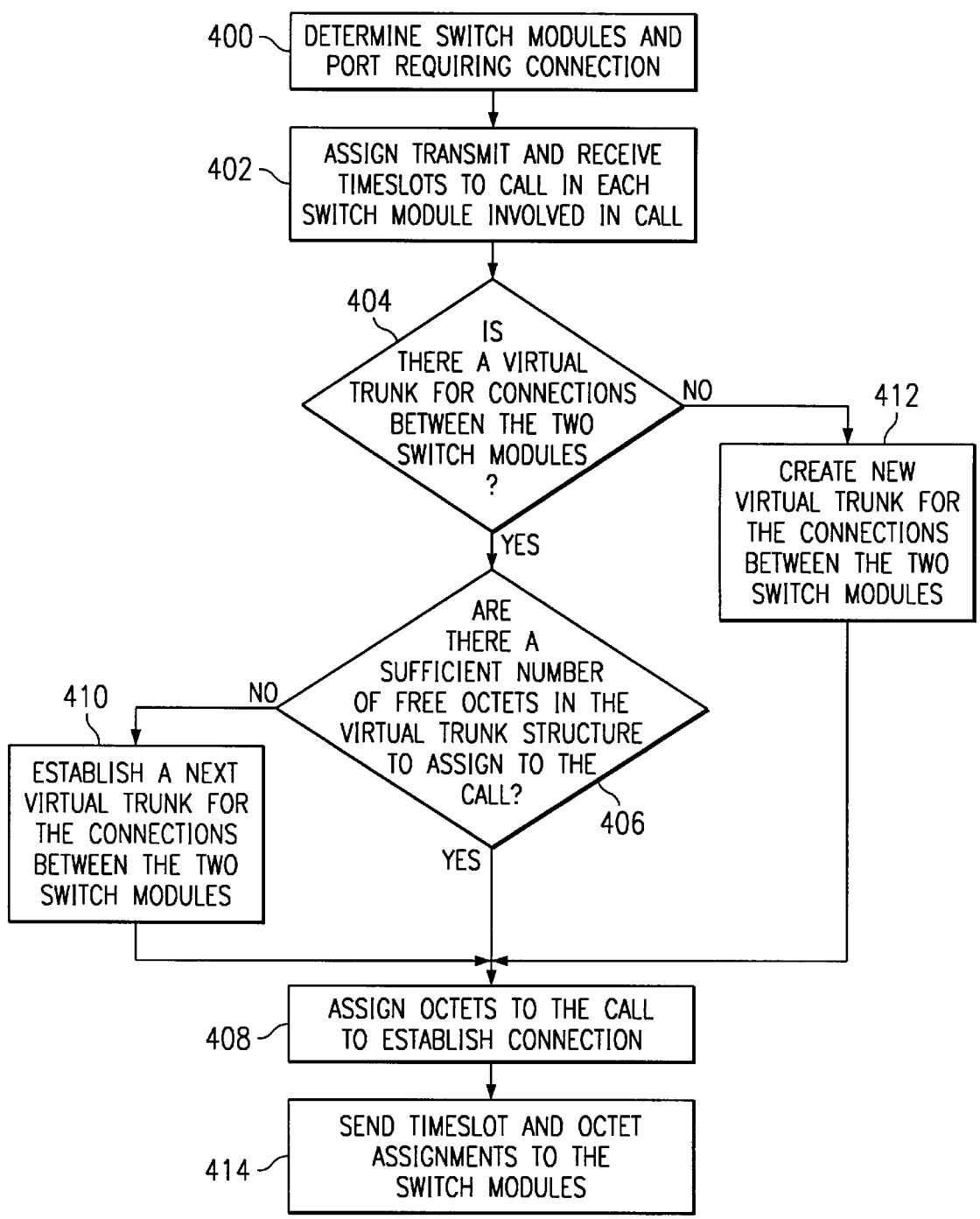
FIG. 4 is a flow chart of the operations of a system controller.

Referring now to FIG. 4 in conjunction with FIG. 1, a switch controller 26, receives instructions from the host computer 34 that a call is to be directed from one particular transmission facility to another, and determines which switching modules 14 and switching ports 24$p$ are involved in the call (step 400). As an example, the switch controller determines that it must establish a connection between port 1 on switch module 14$i$ and a port 3 on switch module 14$j$.

As a next step 402, the switch controller 26 assigns to the call a number of transmit timeslots and receive timeslots on the TDM bus 18 in switch module 14$i$. In the example, the system controller assigns to the call one transmit timeslot and one receive timeslot. These are the timeslots that the port 1 will use to transfer PCM samples to the ATM interface card 24$a_i$ and ATM interface card 24$a_i$ will use to transfer PCM samples received over the network to the switch port. Further, the system controller assigns to the call one transmit timeslot and one receive timeslot on the TDM bus 18 of switch module 14$j$, to transfer PCM samples between the port 3 and the ATM interface card 24$a_j$.

The switch controller 26 next determines if there is a virtual trunk established at switch module 14$i$ for connections between switch modules 14$i$ and 14$j$ (step 404). If a virtual trunk has been established, the controller determines if there are an appropriate number of unassigned octets in the virtual trunk for this call (step 406). In the example, the system controller determines if there is one available octet in the virtual trunk. If so, the system controller assigns to the connection an octet in the virtual trunk structure associated with the virtual trunk (step 408). Otherwise, the system controller establishes another virtual trunk for the connections between the two switch modules 14$i$ and 14$j$, and assigns to the virtual trunk a VPI/VCI value that includes the same VPI associated with the existing virtual trunk and a VCI that is unique to the newly-established virtual trunk. (step 410). The system controller then assigns to the connection one or more octets in the virtual trunk structure associated with the newly-established virtual trunk (step 408).

If there is no virtual trunk established, the switch controller creates one (step 412). The system controller 26 thus determines a structure size, i.e., number of octets. It next determines an appropriate VPI/VCI value for the virtual trunk and the ATM link to the ATM switch. It thus sets the VPI to the value that identifies the pre-established connection path through the ATM switch 12 between the two switch modules, and sets the VCI to a unique value. The system controller 26 then assigns one or more octets of the newly-created virtual trunk to the connection (step 408).

The system controller 26 determines the size of the virtual trunk by making a trade off between the number of possible virtual channels versus the delay in populating the ATM cell payloads. If the size of the virtual trunk is small, many virtual channels may be used. However, there is a relatively long delay in accumulating enough of the virtual trunk structures to fill the 48 octet cell payload, since each virtual trunk structure is available once per PCM sample time, or once every 125 microseconds.

Alternatively, if the virtual trunks are large, it takes fewer of them to fill the cell payload and the payload can thus be assembled in a shorter period of time. There will, however, be fewer virtual channels available. If, for example, 2048 timeslots of a 4096 timeslot TDM bus are transmit timeslots, there is a maximum of $2048/v$ virtual trunks that can be assigned, where v is the structure size in octets. Thus, for connections between two switch modules that are assigned 8-octet virtual trunks, there is a maximum of $2048/8$ virtual channels available, with each virtual channel simultaneously servicing up to eight 64 kb/s calls.

The system controller in step 414 establishes a connection by sending over the network bus 28 to each of the switch modules 14i and 14j the appropriate (1) VPI/VCI and associated HEC values; (2) transmit and receive TDM timeslot assignments; and (3) the virtual trunk structure octet assignments.

Using the same example, the operations of the ATM interface cards $24a_i$ and $24a_j$ are discussed below with reference to FIGS. 5–8.

Figure 5:
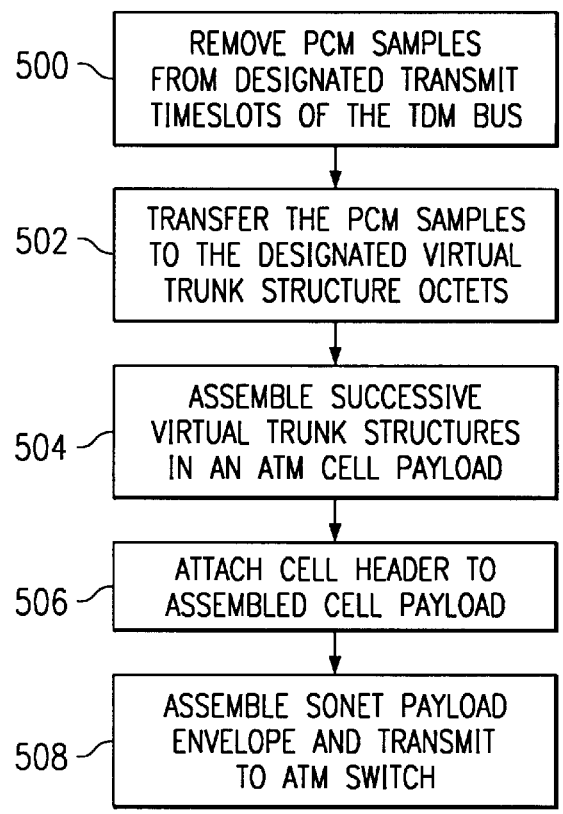
FIG. 5 is a flow chart of operations of the ATM interface card.

Referring now to FIG. 5, the ATM interface card in switch module 14i uses the stored transmit timeslot information in table 201 to pull PCM samples from the TDM bus 18 (step 500). The ATM interface card $24a_i$ then transfers the PCM samples to the appropriate octets of the virtual trunk directed to switching module 14j, using the octet mapping information in table 203 (step 502). The ATM interface card does this once per PCM sample time.

The ATM interface card $24a_i$ in step 504 next assembles succeeding virtual trunk structures in the cell payload of an ATM cell directed to the switch module 14j. The ATM interface card also places an AAL1 header in the first octet in the cell payload and, as appropriate, a structure framing pointer in the second octet of the cell payload. When the cell payload is assembled, the ATM interface card attaches a header to the cell and includes in the header the appropriate VPI/VCI and associated HEC value (step 506). The ATM interface card next assembles the cells in a conventional manner into a SONET payload envelope, adds the appropriate overhead to the SONET frame, and transmits the SONET payload envelope to the ATM switch 12 (step 508).

Figure 6:
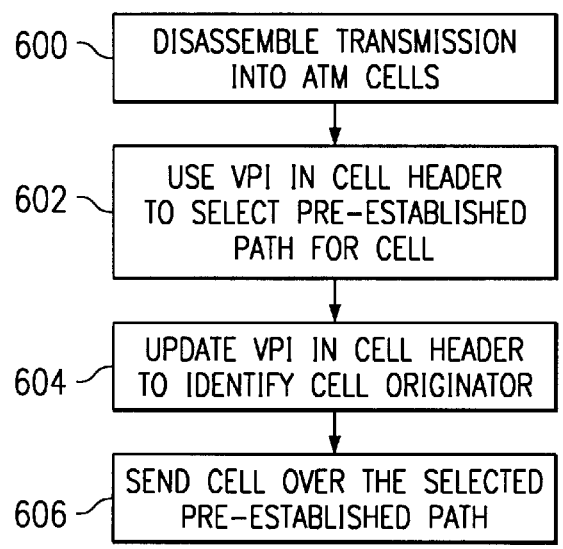
FIG. 6 is a flow chart of the operations of an ATM switch.
Figure 7:
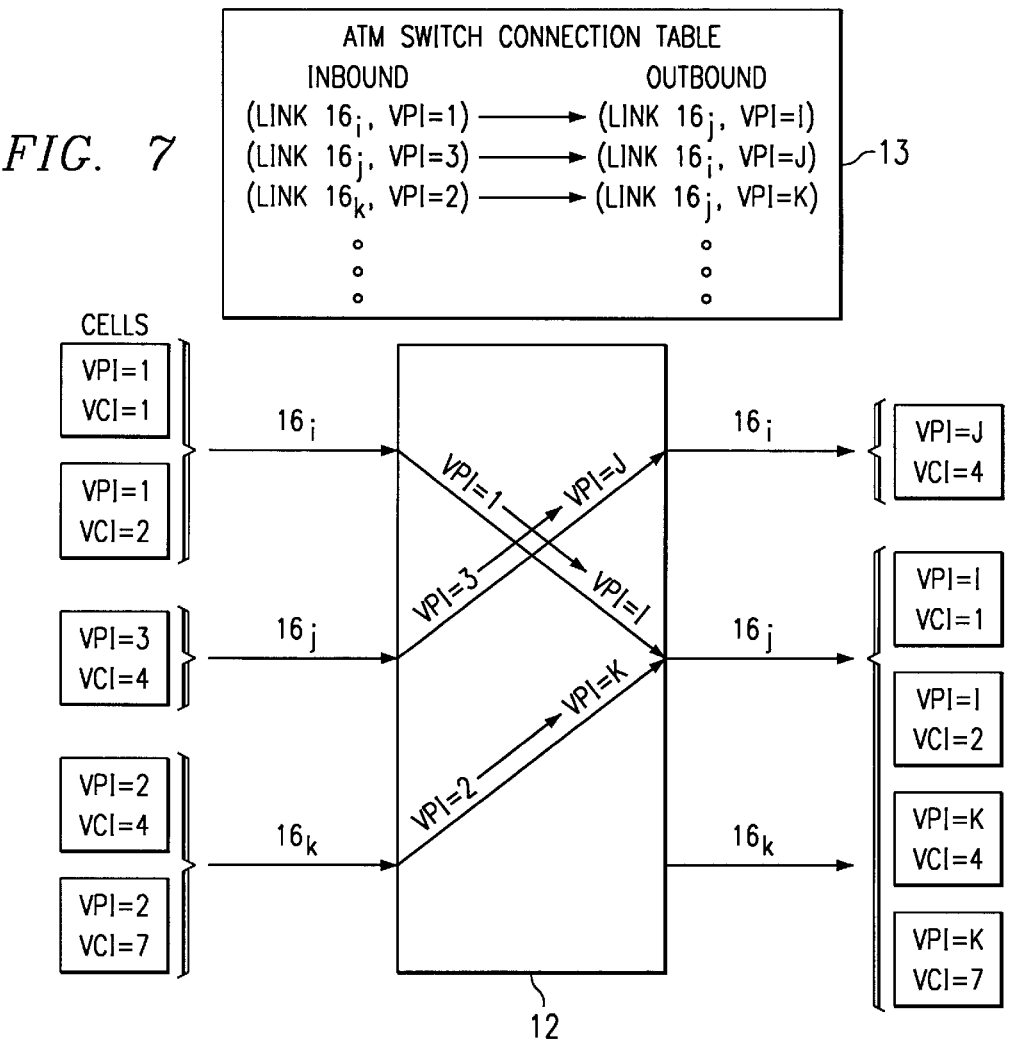
FIG. 7 illustrates the updating of VPIs at the ATM switch.

Referring now to FIG. 6, when the ATM switch 12 receives a SONET payload envelope, it disassembles the payload envelope into its constituent ATM cells (step 600). The switch then uses the VPI in each of the cell headers to enter the table 13 and retrieve the appropriate connection path information (step 602). Before relaying the cell over the pre-established path, the ATM switch updates the cell's VPI, to identify the originator of ATM cell (step 604). As indicated in FIG. 7, the ATM cells originating from switch module 14i arrive at the switch with a VPI value that indicates that the cells are being routed over the pre-established connection path that leads to switch module 14j. The ATM switch 12 updates the VPI indicator in the cell to a value that informs the receiving switch module 14j that the cell originated at switch module 14i. The VPIs are stored in the table 13, as part of the pre-established connection path information. The ATM switch 12 then sends the cells along the appropriate pre-established connection path, that is, along the designated link 16, after assembling the cells into the SONET payload envelope used for transmission on the ATM links (step 606).

Figure 8A:
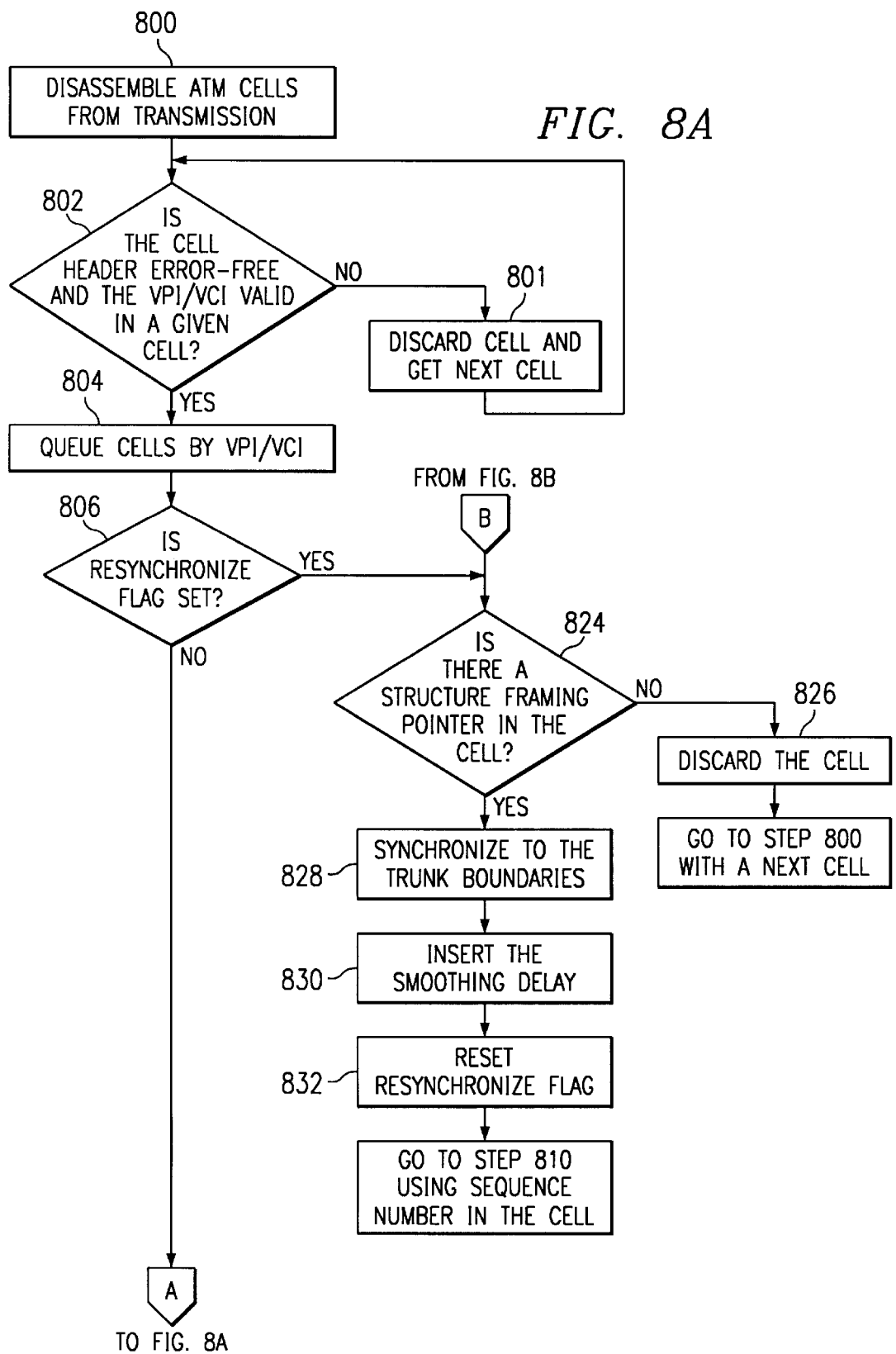
FIG. 8 is a flow chart of further operations of the ATM interface card.

Referring now to FIG. 8, the ATM interface card $24a_j$ on the receiving switch module 14j receives the SONET envelope from the ATM switch 12 and disassembles the envelope into its constituent ATM cells (step 800). The ATM interface card $24a_j$ then checks each cell header for errors and determines if the VPI/VCI value is valid (step 802). Assuming that the cell has an error-free header and a valid VPI/VCI value, the ATM interface card $24a_j$ queues the payload of the cell in a VPI/VCI (circuit emulation) queue (step 804). Otherwise, the ATM interface card 24a discards the cell (step 801).

The ATM interface card $24a_j$ next checks the AAL1 headers for errors and corrects the cell sequence number, as needed. If a resynchronized flag is not set, indicating that the cell disassembly is synchronized to the virtual trunk structure boundaries, the ATM interface card $24a_j$ determines for a given cell if the cell is the next in the sequence of cells associated with that connection (steps 806–808). If the cell is the next in the sequence, the ATM interface card disassembles the cell payload into its constituent virtual trunk structures, using a structure framing pointer in the cell if appropriate. The ATM interface card next transfers the PCM samples contained in the octets of the virtual trunk structure to the appropriate timeslots of the TDM bus, using information in table 219, and updates the expected sequence number by one (steps 810–814).

If the AAL1 header instead contains a sequence number that is one greater than the sequence number in the last received cell, the ATM interface card inserts in the queue an appropriate number of octets for the cell payload of the lost cell. The ATM interface card uses as filler copies of the last valid structure octets received for this connection. It then updates the expected sequence number by two, one for the lost cell and one for the received cell (steps 816–818). It next disassembles the cell payload into virtual trunk structures and transfers the PCM samples from the structure octets to the appropriate timeslots of the TDM bus 18, again using the information in table 219 (steps 818, 820, 814).

If the ATM interface card $24a_j$ determines that the cell sequence number differs from the expected sequence number by more than one, the card discards the cell and begins the process of resynchronizing the structure framing. It first sets the resynchronization flag, which indicates that the structure boundaries are lost (step 822). It then determines if the cell contains a structure framing pointer and, if not, it discards the cell (steps 824–826). If the cell does include a pointer, the ATM interface card uses the pointer to synchronize to the framing of the virtual trunk structures in the cell payload (step 828). It then inserts the smoothing delay and resets the resynchronization flag, to indicate that the cel disassembly is resynchronized to the structure boundaries (steps 830–832). The ATM card then resumes its transfer of PCM samples to the TDM bus, and resets its expected sequence number to one greater than the sequence number in the received cell (steps 832). Thereafter, the ATM interface card resumes checking the sequence numbers of the successive cells and transferring the PCM samples contained in the constituent virtual trunk structures to the TDM bus.

Figure 9:
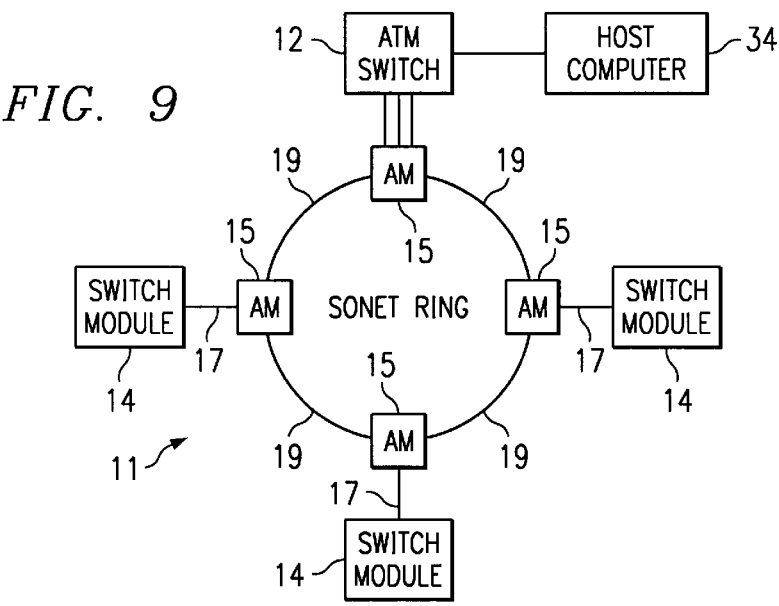
FIG. 9 is a functional block diagram of an alternative configuration for the switching system of FIG. 1.

Referring now to FIG. 9, the switching system 10 may be configured as a SONET ring 11. The switching modules 14 are attached to the ring through access multiplexers 15, and are connected to the access multiplexers 15 over the high-speed links 17. The ATM cells are sent from the switch modules 14 through the access multiplexers 15 to the ATM switch 12, over the SONET ring links 19. The connection control information from the system controller 26 is sent to the switch modules 14 over the ring as ATM control message cells. As in the switching system 10, all connection paths through the ATM switch 12 are pre established, and there is thus no need for connection establishment signaling between the ATM switch 12 and the system controller 26. Also, as in the switching system 10, the connections between the switch ports are dynamically established by the switch controller, which uses as part of each of the connections the pre-established connection paths through the ATM switch.

In either switching system 10 or 11, redundant ATM switches, or ATM switches with redundant capacity may be used. Further, redundant system controllers, ATM interface cards and/or network bus controllers may be used.

Various processors described herein may be part of a single processor. Some or all of the operations of the processors may be performed in software. Further, processor operations may be performed in parallel with other operations of the same processor of those of other processors in the system.

The switching system 10 or 11 can be built with "off-the-shelf" ATM switches. It thus does not require the custom designed second stage that is required by known prior systems that use time-multiplexed switches as their second stages. This means that cost of the switching system 10 or 11 decreases as the cost of ATM switches decreases either because of advances in ATM technology or because of production volumes.

The switching modules 14 in the switching system 10 or 11 may be distributed over a network. The switch modules 14 thus need not be physically located at the same site, as is required in the systems that use the time-multiplexed switch as their second stages. Further the capacity of the switching system may be increased by adding additional switch modules to the network, without requiring the re-design of a second stage switch matrix or the use of additional, and relatively expensive, interface circuitry that is required when increasing the capacity of a system that uses one or more fiber optic rings as the second stage.

What is claimed is:

1. A multiple stage switching system for use in telecommunications networks, the switching system including:
    A. a plurality of switch modules, each switch module including one or more switch ports, an ATM interface card and a time-division-multiplexed "TDM" bus that transfers user data between the switch ports and the ATM interface card;
    B. an asynchronous transfer mode "ATM" switch for interconnecting the switch modules, the ATM switch transferring the user data through the switch over pre-established connection paths;
    C. a system controller for dynamically establishing connections between the switch ports of the switch modules by establishing for the connections that include a given pair of switch modules one or more virtual trunks to transfer the user data between the TDM buses of the switch modules and cell payloads of ATM cells that are directed over one of the pre-established connection paths in the ATM switch.

2. The multiple stage switching system of claim 1 wherein:
    a. the TDM bus transfers the user data in the form of pulse-code-modulation "PCM" samples that are placed on the TDM bus in timeslots;
    b. the ATM interface card transfers the user data in the form of ATM cells, with each ATM cell including in a multiple-octet cell payload a plurality of PCM samples; and
    c. the system controller establishes a connection by assigning to each switch port involved in the transfer of the user data
        i. transmit and receive timeslots on the TDM bus, and
        ii. octets in one or more multiple-octet structures associated with the virtual trunks that the system controller established for the transfer of user data between the two switch modules involved in the connection.

3. The multiple stage switching system of claim 2 wherein the ATM interface card assembles in the structures the PCM samples from the transmit timeslots assigned to a connection, and assembles the structures as the octets of the cell payload of the ATM cell that is directed over the connection path associated with the virtual trunk established for the connection.

4. The multiple stage switching system of claim 3 wherein:
    the system controller associates each virtual trunk with a VPI/VCI value, and
    the ATM interface card assembles virtual trunk structures in the ATM cell that has in a cell header the same VPI/VCI value as is associated with the virtual trunk.

5. The multiple stage switching system of claim 4 wherein the system controller establishes a new virtual trunk for a new connection when the octets in an established virtual trunk are assigned to prior connections, the system controller associating the new virtual trunk with a VPI/VCI that includes the same VPI that is associated with the established virtual trunk.

6. A method for dynamically establishing connections between switch ports in a switching system that includes an asynchronous transfer mode "ATM" switch that uses permanent virtual connections as a second stage, the method including the steps of:
    A. assigning transmit and receive timeslots on a time-division-multiplexed "TDM" bus in each of a plurality of switching modules involved in the connection;
    B. assigning octets in multiple-octet structures associated with virtual trunks that use as connection paths through the ATM switch the permanent virtual connections.

7. The method of claim 6, wherein the method further includes the steps of:
    C. transferring user data in the form of pulse-code-modulation "PCM" samples to the transmit timeslots assigned to the connection;
    D. transferring the PCM samples from the timeslots assigned to the connection to the octets in the structures that are associated with the virtual trunk assigned to the connection;
    E. assembling the structures in a cell payload of an ATM cell; and
    F. transferring the cell on the connection path associated with the virtual trunk.

8. The method of claim 7, wherein the method further includes the steps of:

G. disassembling an ATM cell received over the connection into the multiple-octet structures associated with the virtual trunk;

H. transferring PCM samples included in the octets of the structures to the receive timeslots assigned to the connection; and I. removing the PCM samples from the timeslots assigned to the connection and recovering the user data.

9. An apparatus, comprising:

a first interface which converts information between a first communication protocol and a second communication protocol different from said first communication protocol;

a second interface which converts information between said second communication protocol and a third communication protocol different from said second communication protocol;

a first switch port coupled to said first interface by a pre-established first communication path that carries an ongoing first communication stream which conforms to said first communication protocol and which includes a plurality of selectively assignable portions that can each be selectively populated with user data;

a switching section operatively coupled to each of said first and second interfaces, said switching section having between said first and second interfaces a pre-established second communication path that carries an ongoing second communication stream which conforms to said second communication protocol and which includes a plurality of selectively assignable portions that can each be selectively populated with user data;

a second switch port coupled to said second interface by a pre-established third communication path that carries an ongoing third communication stream which conforms to said third communication protocol and which includes a plurality of selectively assignable portions that can each be selectively populated with user data; and system control structure operable to dynamically establish a virtual path for user data between said first and second switch ports by selectively assigning to said virtual path respective said portions in each of said first, second and third communication streams.

10. An apparatus according to claim 9, wherein said system control structure is operatively coupled to each of said switch ports and each of said interfaces.

11. An apparatus according to claim 9:

including a third interface which converts information between said second communication protocol and a fourth communication protocol different from said second communication protocol;

including a third switch port coupled to said third interface by a pre-established fourth communication path that carries an ongoing fourth communication stream which conforms to said fourth communication protocol and which includes a plurality of selectively assignable portions that can each be selectively populated with user data;

wherein said switching section has between said first and third interfaces a pre-established fifth communication path that carries an ongoing fifth communication stream which conforms to said second communication protocol and which includes a plurality of selectively assignable portions that can each be selectively populated with user data, and has between said second and third interfaces a pre-established sixth communication path that carries an ongoing sixth communication stream which conforms to said second communication protocol and which includes a plurality of selectively assignable portions that can each be selectively populated with user data; and wherein said system control structure is operable to dynamically establish a virtual path for user data between said first and third switch ports by selectively assigning thereto respective said portions in each of said first, fourth and fifth communication streams, and to dynamically establish a virtual path for user data between said second and third switch ports by selectively assigning thereto respective said portions in each of said second, fourth and sixth communication streams.

12. An apparatus according to claim 9:

including a third switch port operatively coupled to said first interface by said first communication path;

including a fourth switch port operatively coupled to said second interface by said third communication path; and wherein said system control structure includes a first network bus controller, a first packet communication bus coupling said first network bus controller to said first interface and to said first and third switch ports, a second network bus controller, a second packet communication bus coupling said second network bus controller to said first interface and to said second and fourth switch ports, a system controller, and a network bus coupling said system controller to each of said first and second network bus controllers.

13. An apparatus according to claim 9, wherein said second communication protocol is an asynchronous transfer mode protocol which uses cells having payloads that include said portions of said second communication stream.

14. An apparatus according to claim 13, wherein said first and third communication protocols are the same, and are a time division multiplexing protocol having a plurality of timeslots which serve as said portions of said first and third communication streams.

15. An apparatus comprising a switch module which includes:

a pre-established first communication path that carries an ongoing first communication stream which conforms to a first communication protocol and which includes a plurality of selectively assignable portions that can each be selectively populated with user data;

a link adapted to operatively couple said switch module to external structure, said link including a pre-established second communication path that carries an ongoing second communication stream which conforms to a second communication protocol and which includes a plurality of selectively assignable portions that can each be selectively populated with user data, said second communication protocol being different from said first communication protocol;

an interface which is coupled to said link and to said first communication path, and which converts information between said first communication protocol and said second communication protocol;

first and second switch ports which are each coupled to said first communication path; and control structure operable to facilitate dynamic establishment of a virtual path for user data from one of said first and second switch ports through said first and second communication paths and said interface by selectively assigning to said virtual path respective said portions in each of said first and second communication streams.

16. An apparatus according to claim 15, wherein said control structure includes a network bus controller adapted to be coupled to a network bus, and a packet communication bus coupling said network bus controller to said interface and first and second switch ports.

17. An apparatus according to claim 16, wherein said control structure includes a system controller, and a network bus operatively coupling said system controller and said network bus controller.

18. An apparatus according to claim 16, including a plurality of card slots which are each coupled to said packet communication bus and to said first communication path, said first and second switch ports each being a card which is removably inserted into a respective one of said card slots.

19. An apparatus according to claim 15, wherein said second communication protocol is an asynchronous transfer mode protocol which uses cells having payloads that include said portions of said second communication stream.

20. An apparatus according to claim 19, wherein said first communication protocol is a time division multiplexing protocol having a plurality of timeslots which serve as said portions of said second communication stream.

21. A method of controlling communication between first and second switch ports which are coupled through respective pre-established first and second communication paths and through respective first and second interfaces to a switching section which includes a pre-established third communication path between said interfaces, each of said first, second and third communication paths carrying a respective one of first, second and third ongoing communication streams which each conform to a respective one of first, second and third communication protocols, and which each include a plurality of selectively assignable portions that can each be selectively populated with user data, said third communication protocol being different from said first and second communication protocols, and said interfaces each being operable to convert information between said third communication protocol and a respective one of said first and second communication protocols, said method comprising the step of dynamically establishing a virtual path for user data between said first and second switch ports by selectively assigning to said virtual path respective said portions in each of said first, second and third communication streams.

22. A method according to claim 21, including a third switch port which is coupled to said switching section through a fourth pre-established communication path and a third interface, said switching section including a pre-established fifth communication path between said first and third interfaces, and a pre-established sixth communication path between said second and third interfaces, each of said fourth, fifth and sixth communication paths carrying a respective one of fourth, fifth and sixth ongoing communication streams which respectively conform to a fourth communication protocol, said third communication protocol, and said third communication protocol, and which each include a plurality of selectively assignable portions that can each be selectively populated with user data, said third communication protocol being different from said fourth communication protocol, and said third interface being operable to convert information between said third and fourth communication protocols, said method comprising the further steps of dynamically establishing a virtual path for user data between said first and third switch ports by selectively assigning thereto respective said portions in each of said first, fifth and fourth communication streams, and dynamically establishing a virtual path for user data between said second and third switch ports by selectively assigning thereto respective said portions in each of said second, sixth and fourth communication streams.

23. A method according to claim 21, including the step of selecting as said third communication protocol an asynchronous transfer mode protocol which uses cells having payloads that include said portions of said third communication stream.

24. A method according to claim 23, wherein said first and second communication protocols are the same, and are a time division multiplexing protocol having a plurality of timeslots which serve as said portions of said first and second communication streams.

25. A computer readable medium encoded with a computer program operable when executed to control communication between first and second switch ports which are coupled through respective pre-established first and second communication paths and through respective first and second interfaces to a switching section which includes between said interfaces a pre-established third communication path, each of said first, second and third communication paths carrying a respective one of first, second and third ongoing communication streams which each conform to a respective one of first, second and third communication protocols, and which each include a plurality of selectively assignable portions that can each be selectively populated with user data, said third communication protocol being different from said first and second communication protocols, and said interfaces each being operable to convert information between said third communication protocol and a respective one of said first and second communication protocols, said control by said computer program of communication between said first and second switch ports including said computer program being operable when executed to dynamically establish a virtual path for user data between said first and second switch ports by selectively assigning to said virtual path respective said portions in each of said first, second and third communication streams.

26. A computer readable medium according to claim 25, wherein said computer program is further operable when executed to control a third switch port which is coupled to said switching section through a fourth pre-established communication path and a third interface, said switching section including a pre-established fifth communication path between said first and third interfaces, and a pre-established sixth communication path between said second and third interfaces, each of said fourth, fifth and sixth communication paths carrying a respective one of fourth, fifth and sixth ongoing communication streams which respectively conform to a fourth communication protocol, said third communication protocol, and said third communication protocol, and which each include a plurality of selectively assignable portions that can each be selectively populated with user data, said third communication protocol being different from said fourth communication protocol, and said third interface being operable to convert information between said third and fourth communication protocols, said control by said computer program including said computer program being operable when executed to dynamically establish a virtual path for user data between said first and third switch ports by selectively assigning thereto respective said portions in each of said first, fifth and fourth communication streams, and dynamically establishing a virtual path for user data between said second and third switch ports by selectively assigning thereto respective said portions in each of said second, sixth and fourth communication streams.

27. A computer readable medium according to claim 25, wherein said computer program is operable to use for said third communication protocol an asynchronous transfer mode protocol which uses cells having payloads that include said portions of said third communication stream, and is operable to use for each of said first and second communication protocols a time division multiplexing protocol having a plurality of timeslots which serve as said portions of said first and second communication streams.

* * * * *